United States Patent
Alroaithi et al.

(10) Patent No.: US 11,919,998 B2
(45) Date of Patent: Mar. 5, 2024

(54) POLYCARBONATE POLYOL NANOCOMPOSITES

(71) Applicant: Saudi Aramco Technologies Company, Dhahran (SA)

(72) Inventors: Mohammad S. Alroaithi, Thuwal (SA); Mohammed Alshammasi, Qatif (SA); Wei Xu, Thuwal (SA)

(73) Assignee: Saudi Aramco Technologies Company, Dhahran (SA)

( * ) Notice: Subject to any disclaimer, the term of this patent is extended or adjusted under 35 U.S.C. 154(b) by 114 days.

(21) Appl. No.: 17/575,755

(22) Filed: Jan. 14, 2022

(65) Prior Publication Data
US 2022/0227924 A1     Jul. 21, 2022

Related U.S. Application Data

(60) Provisional application No. 63/137,927, filed on Jan. 15, 2021.

(51) Int. Cl.
*C08G 64/02*     (2006.01)
*C08G 64/32*     (2006.01)
(Continued)

(52) U.S. Cl.
CPC ....... *C08G 64/0208* (2013.01); *C08G 64/323* (2013.01); *C08G 64/34* (2013.01);
(Continued)

(58) Field of Classification Search
CPC .. C08G 64/0208; C08G 64/323; C08G 64/34; C08K 9/04; C08K 2201/011; C08K 3/346; C08L 69/00
See application file for complete search history.

(56) References Cited

U.S. PATENT DOCUMENTS 6,552,113 B2    4/2003   Bagrodia et al.
6,653,388 B1   11/2003   Barbee et al.
(Continued)

FOREIGN PATENT DOCUMENTS

EP         3 741 812 A1    11/2020
WO   WO-2005/042630 A2    5/2005
(Continued)

OTHER PUBLICATIONS

Jain et al., Strong decrease in viscosity of nanoparticle-filled polymer melts through selective adsorption, Soft Matter, 2008, 4, 1848-1854. (Year: 2008).*
(Continued)

*Primary Examiner* — Marc S Zimmer
*Assistant Examiner* — Surbhi M Du
(74) *Attorney, Agent, or Firm* — Osha Bergman Watanabe & Burton LLP

(57) ABSTRACT

In one aspect, the present disclosure encompasses a nanocomposite composition comprising a polycarbonate polyol and a nanofiller, wherein the polycarbonate polyol comprises: (a) a polycarbonate polyol derived from copolymerization of $CO_2$ and one or more epoxides; and/or (b) an aliphatic polycarbonate polyol. In a second aspect, the present disclosure encompasses a method for preparing the nanocomposite composition. In a third aspect, the present disclosure encompasses a method of improving a performance property of a polycarbonate polyol, the method comprising the step of forming the nanocomposite composition.

17 Claims, 4 Drawing Sheets

(51) Int. Cl.
    *C08G 64/34*     (2006.01)
    *C08K 3/34*     (2006.01)
    *C08K 9/04*     (2006.01)
    *C08L 69/00*     (2006.01)

(52) U.S. Cl.
    CPC ............... *C08K 3/346* (2013.01); *C08K 9/04* (2013.01); *C08L 69/00* (2013.01); *C08K 2201/011* (2013.01)

(56) References Cited

U.S. PATENT DOCUMENTS

| | | | |
|---|---|---|---|
| 7,504,472 | B2 | 3/2009 | Williamson |
| 8,173,761 | B2 | 5/2012 | Brunelle et al. |
| 8,865,833 | B2 | 10/2014 | Biswas et al. |
| 10,138,369 | B2 * | 11/2018 | Allen .................... C08G 18/44 |
| 10,370,503 | B2 | 8/2019 | Soler et al. |
| 2008/0081865 | A1 | 4/2008 | Biswas et al. |

FOREIGN PATENT DOCUMENTS

| | | |
|---|---|---|
| WO | WO-2008/019253 A2 | 2/2008 |
| WO | WO-2010/028362 A1 | 3/2010 |
| WO | WO-2019/204553 A1 | 10/2019 |
| WO | WO-2020/028606 A1 | 2/2020 |
| WO | WO-2021/262845 A1 | 12/2021 |
| WO | WO-2022/153234 A1 | 7/2022 |

OTHER PUBLICATIONS

Mackay et al., Nanoscale effects leading to non-Einstein-like decrease in viscosity, Nature Materials 2003, vol. 2, 762-766. (Year: 2003).*

Gacitua, W. E. et al., Polymer nanocomposites: synthetic and natural fillers a review, Maderas. Ciencia y tecnología, 7(3): 159-178 (2005).

Gao, L. et al., A novel one-pot synthesis of poly(propylene carbonate) containing cross-linked networks by copolymerization of carbon dioxide, propylene oxide, maleic anhydride, and furfuryl glycidyl ether, Polymers, 11: 881 (2019).

Kong, J. et al., The excellent gas barrier properties and unique mechanical properties of poly (propylene carbonate)/organo-montmorillonite nanocomposites, Polymer Bulletin, 74: 5065-5082 (2017).

Muthuraj, R. and Mekonnen, T., Carbon dioxide-derived poly(propylene carbonate) as a matrix for composites and nanocomposites: performances and applications, Macromolecular Materials and Engineering, 1800366:1-19 (2018).

Prashantha, K. et al., Processing and characterization of halloysite nanotubes filled polypropylene nanocomposites based on a masterbatch route: effect of halloysites treatment on structural and mechanical properties, eXPRESS Polymer Letters, 5(4):295-307 (2011).

Shi, X. and Gan, Z., Preparation and characterization of poly(propylene carbonate)/montmorillonite nanocomposites by solution intercalation, European Polymer Journal, 43: 4852-4858 (2007).

Xu, J. et al., Biodegradable poly(propylene carbonate)/montmorillonite nanocomposites prepared by direct melt intercalation, Materials Research Bulletin, 41:244-252 (2006).

Zhang, Z. et al., Morphology, thermal stability and rheology of poly(propylene carbonate)/organoclay nanocomposites with different pillaring agents, Polymer, 49(12):2947-2956 (2008).

Zheng, F. et al., Synthesis and characterization of poly(propylene carbonate)/modified sepiolite nanocomposites, Polymer Composites, 37:21-27 (2016).

International Search Report for PCT/IB2022/050298, 5 pages (dated Apr. 20, 2022).

* cited by examiner

POLYCARBONATE POLYOL NANOCOMPOSITES

CROSS REFERENCE TO RELATED APPLICATIONS

This application claims the benefit of U.S. Provisional Application No. 63/137,927, filed Jan. 15, 2021, which is herein incorporated by reference in its entirety.

FIELD OF INVENTION

This invention pertains to the field of nanocomposite compositions. More particularly, the invention pertains to a nanocomposite composition comprising a polycarbonate polyol and a nanofiller.

BACKGROUND

Polycarbonate polyols are useful building blocks for the construction of polymer materials utilized in applications such as polyurethane foams, polyurethane coatings, polyurethane urea elastomers and plastics, adhesives, polymeric coatings and surfactants among others. Certain polycarbonate polyols, for example poly(propylene carbonate), exhibit higher viscosity than traditional polyether polyols. The viscous nature of these polycarbonate polyols renders them difficult to manipulate in processes such as polyurethane production. Thus, there remains a need for polycarbonate polyol compositions with reduced viscosity, in order to improve the utility of these polymers in polyurethane production.

SUMMARY OF INVENTION

The high viscosity of certain polycarbonate polyols may be caused by their rigid backbone, intermolecular hydrogen bonding, and possibly the microphase separation of the starter (e.g., dipropylene glycol) from the polycarbonate domain. However, such high viscosity can significantly decrease the utility of such polycarbonate polyols in certain applications such as polyurethane manufacturing. The present disclosure encompasses the recognition that physical and chemical properties of polycarbonate polyols can be altered by incorporating a nanofiller to produce polymer nanocomposites. Although nanocomposites of some polycarbonates are known, the observed trend is that the viscosity of these nanocomposites is increased as compared to the neat polycarbonate material (Gacitua, William, Aldo Ballerini, and Jinwen Zhang. "Polymer nanocomposites: synthetic and natural fillers a review." *Maderas. Ciencia y tecnologia* 7.3 (2005): 159-178; Zhang, Zhihao, et al. "Morphology, thermal stability and rheology of poly (propylene carbonate)/organoclay nanocomposites with different pillaring agents." *Polymer* 49.12 (2008): 2947-2956; Kong, Junjun, et al. "The excellent gas barrier properties and unique mechanical properties of poly (propylene carbonate)/organo-montmorillonite nanocomposites." *Polymer Bulletin* 74.12 (2017): 5065-5082). It is against this backdrop that the present disclosure provides, among other things, nanocomposites comprising a polycarbonate polyol and a nanofiller, such nanocomposites displaying an unexpected effect of lower viscosity, compared to corresponding neat polycarbonate polyols. The lower viscosity of provided nanocomposites renders them more amenable to use in scaled polyurethane production and other uses.

In one aspect, the present invention provides a nanocomposite composition comprising a polycarbonate polyol and a nanofiller,
wherein the polycarbonate polyol comprises:
(a) a polycarbonate polyol derived from copolymerization of $CO_2$ and one or more epoxides; and/or
(b) an aliphatic polycarbonate polyol.

In another aspect, the present invention provides a method for preparing a nanocomposite composition, the method comprising the steps of
(a) providing a polycarbonate polyol,
wherein the polycarbonate polyol comprises:
(i) a polycarbonate polyol derived from copolymerization of $CO_2$ and one or more epoxides; and/or
(ii) an aliphatic polycarbonate polyol;
(b) providing a nanofiller; and
(c) mixing compositions in steps (a) and (b), and allowing the mixture to form a nanocomposite composition.

In another aspect, the present invention encompasses a method of improving a performance property of a polycarbonate polyol, the method comprising the step of forming a nanocomposite composition comprising i) the polycarbonate polyol and ii) a nanofiller.

DEFINITIONS

Figure 1A:
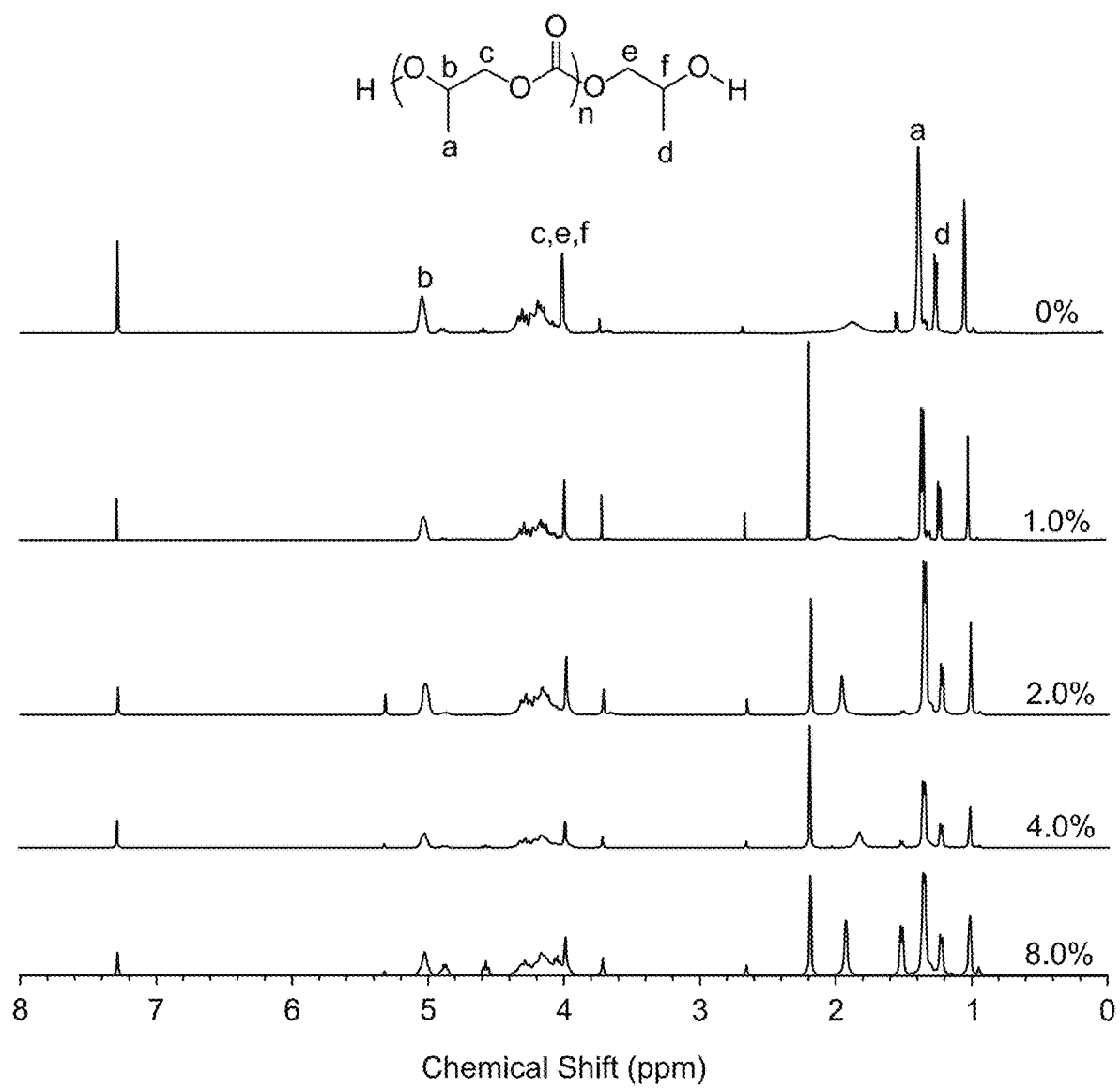
FIG. 1A depicts the $^1$H NMR spectra of nanocomposite compositions comprising poly(propylene carbonate) with different nanoclay concentrations.

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain molecules (e.g., polymers, epoxides, etc.) of the present invention can comprise one or more asymmetric centers, and thus can exist in various stereoisomeric forms, e.g., enantiomers and/or diastereomers. Thus, inventive molecules and compositions thereof may be in the form of an individual enantiomer, diastereomer or geometric isomer, or may be in the form of a mixture of stereoisomers. In certain embodiments, the molecules of the invention are enantiopure molecules. In certain embodiments, mixtures of enantiomers or diastereomers are provided.

Certain molecules described herein may have one or more double bonds that can exist as either the Z or E isomer, unless otherwise indicated. The invention additionally encompasses the molecules as individual isomers substantially free of other isomers and alternatively, as mixtures of various isomers, e.g., racemic mixtures of enantiomers. In addition to the above-mentioned molecules per se, this invention also encompasses compositions comprising one or more molecules.

As used herein, the term "about," when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the reference value unless otherwise stated or otherwise evident from the context (except where such number would exceed 100% of a possible value).

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetitions of units derived, actually or conceptually, from molecules of low relative molecular mass. In certain embodiments, a polymer is comprised of substantially alternating units derived from $CO_2$ and an epoxide (e.g., poly(propylene carbonate).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms and may be substituted or unsubstituted. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "aliphatic polycarbonate polyol", refers to polycarbonate polyol chains wherein repeating carbonate moieties in the backbone chain are separated by optionally substituted aliphatic groups. In some embodiments, repeating carbonate moieties in the backbone chain are separated by optionally substituted two-carbon aliphatic groups. In some embodiments, repeating carbonate moieties in the backbone chain are separated by ethylene or propylene groups. In some embodiments, aliphatic polycarbonate polyols refer to copolymers of carbon dioxide and epoxide monomers having a structure:

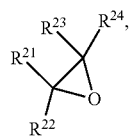

where, $R^{21}$, $R^{22}$, $R^{23}$, and $R^{24}$, are each independently selected from the group consisting of hydrogen, fluorine, an optionally substituted $C_{1-12}$ aliphatic (e.g., optionally substituted $C_1$-$C_6$ aliphatic) group, an optionally substituted $C_{1-12}$ heteroaliphatic group, and an optionally substituted phenyl group, where any two or more of $R^{21}$, $R^{22}$, $R^{23}$, and $R^{24}$ may optionally be taken together with intervening atoms to form one or more optionally substituted 3- to 12-membered rings optionally containing one or more heteroatoms. Exemplary epoxide monomers include

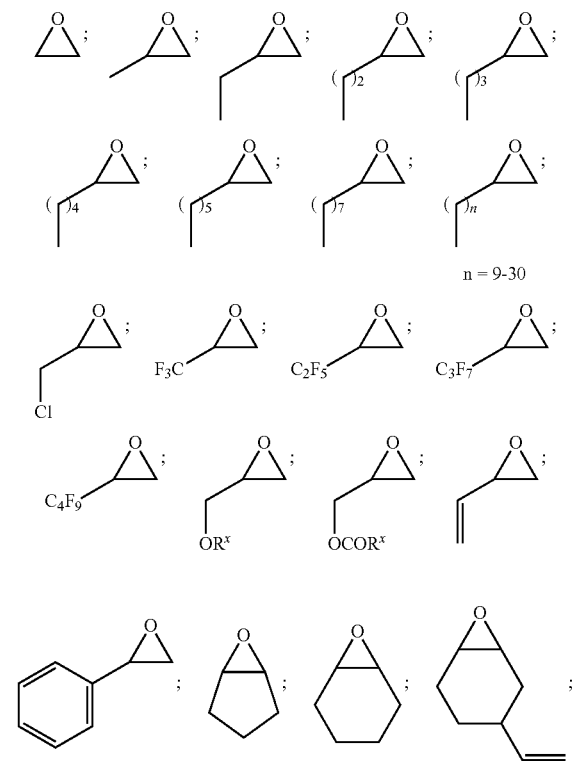

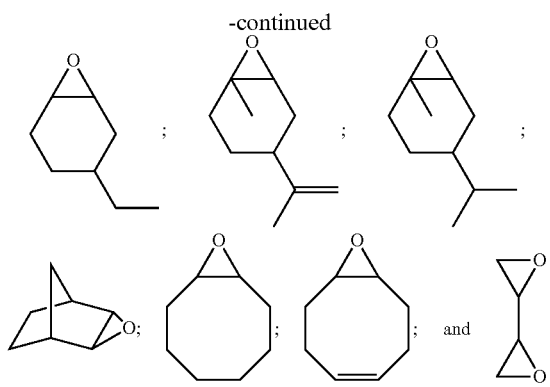

wherein each $R^x$ is, independently, selected from optionally substituted aliphatic, optionally substituted heteroaliphatic, optionally substituted aryl fluoroalkyl, and optionally substituted heteroaryl.

The term "nanocomposite(s)" or "nanocomposite composition(s)", as used herein, refers to a polymer, a copolymer or a blend thereof having nanoparticles or nanofillers dispersed in the polymer matrix.

The term "nanofiller", as used herein, refers to filler materials having at least one dimension below 100 nm. Exemplary nanofillers include nanoclays, carbon nanofillers, metal oxides, metallic particles, polymer nanofibers, natural fibers.

The term "dispersion" or "dispersed", as used herein, refers to the distribution of nanoparticles or nanofillers in a polymer matrix.

The term "modified nanoclay" or "treated nanoclay", as used herein, refers to a nanoclay treated with at least one functionalizing agent. Exemplary functionalizing agents include ammonium salts, polyalkyl ammonium salts, polyalkyl aminopyridinium salts, polyalkyl guanidinium salts, polyalkyl imidazolium salts, polyalkyl benzimidazolium salts, phosphonium salts, sulfonium salts, and mixtures thereof.

The term "intercalate" or "intercalated", as used herein, refers to a higher degree of interaction between a polymer matrix and a nanofiller (e.g., a modified nanoclay) as compared to mere dispersion of a nanofiller (e.g., a modified nanoclay) in a polymer matrix. For example, when a polymer matrix is said to intercalate a modified nanoclay, the modified nanoclay exhibits an increase in the interlayer spacing between adjacent nanoclay platelets, as compared to a starting modified nanoclay.

The term "exfoliate" or "exfoliated", as used herein, refers to nanofiller (e.g., nanoclay) platelets dispersed mostly in an individual state throughout a polymer matrix. As used herein, "exfoliated" denotes the highest degree of separation of nanofiller (e.g., nanoclay) platelets. "Exfoliation" refers to a process by which an exfoliate is formed from an intercalated or otherwise dispersed nanofiller (e.g., modified nanoclay) within a polymer matrix.

DETAILED DESCRIPTION OF CERTAIN EMBODIMENTS

I. Nanocomposite Composition
  A. Polycarbonate Polyols

In certain embodiments, a nanocomposite composition of the present invention comprises a polyol component and a nanofiller component, wherein the polyol component comprises a polycarbonate polyol. In some embodiments, a polycarbonate polyol is an aliphatic polycarbonate polyol. In some embodiments, a polycarbonate polyol is a substantially alternating aliphatic polycarbonate polyol. In some embodiments, a polycarbonate polyol is derived from the copolymerization of $CO_2$ and one or more epoxides. Examples of suitable polycarbonate polyols, as well as methods of making them are disclosed in PCT publication WO 2010/028362, the entirety of which is incorporated herein by reference.

It will be appreciated that within the present disclosure, "polycarbonate polyol(s)" refers to a composition comprising a mixture of individual polycarbonate polyol chains. Similarly, "aliphatic polycarbonate polyol(s)" refers to a composition comprising a mixture of individual aliphatic polycarbonate polyol chains.

It is advantageous for many of the embodiments described herein that the polycarbonate polyols used have a high percentage of reactive end groups (e.g., —OH groups).

In certain embodiments, at least 90% of the end groups of the polycarbonate polyol composition are reactive end groups. In certain embodiments, at least 95%, at least 96%, at least 97% or at least 98% of the end groups of the polycarbonate polyol composition are reactive end groups. In certain embodiments, more than 99%, more than 99.5%, more than 99.7%, or more than 99.8% of the end groups of the polycarbonate polyol composition used are reactive end groups. In certain embodiments, more than 99.9% of the end groups of the polycarbonate polyol composition used are reactive end groups.

In certain embodiments, at least 90% of the end groups of the polycarbonate polyol composition are —OH groups. In certain embodiments, at least 95%, at least 96%, at least 97% or at least 98% of the end groups of the polycarbonate polyol composition are —OH groups. In certain embodiments, more than 99%, more than 99.5%, more than 99.7%, or more than 99.8% of the end groups of the polycarbonate polyol composition are OH groups. In certain embodiments, more than 99.9% of the end groups of the polycarbonate polyol composition used are —OH groups.

Another way of expressing the —OH end-group content of a polyol composition is by reporting its OH#, which is measured using methods well known in the art. In certain embodiments, polycarbonate polyol compositions used in the present invention have an OH# greater than about 20. In certain embodiments, polycarbonate polyol compositions utilized in the present invention have an OH# greater than about 40. In certain embodiments, polycarbonate polyol compositions have an OH# greater than about 50, greater than about 75, greater than about 100, or greater than about 120.

In some embodiments, polycarbonate polyol compositions have an OH# of between about 40 and about 120. In some embodiments, polycarbonate polyol compositions have an OH# of between about 40 and about 100. In some embodiments, polycarbonate polyol compositions have an OH# of between about 40 and about 80. In some embodiments, polycarbonate polyol compositions have an OH# of between about 40 and about 70. In some embodiments, polycarbonate polyol compositions have an OH# of between about 50 and about 60. In some embodiments, polycarbonate polyol compositions have an OH# of about 50. In some embodiments, polycarbonate polyol compositions have an OH# of about 56.

In some embodiments, polycarbonate polyol compositions have an OH# of between about 80 and about 120. In some embodiments, polycarbonate polyol compositions have an OH# of between about 100 and about 120. In some embodiments, polycarbonate polyol compositions have an OH# of between about 105 and about 115. In some embodiments, polycarbonate polyol compositions have an OH# of about 112.

In certain embodiments, it is advantageous if polycarbonate polyol compositions have a substantial proportion of primary hydroxyl end groups. These are the norm for compositions comprising poly(ethylene carbonate), but for polyols derived from copolymerization of substituted epoxides with $CO_2$, it is common for some or most of the chain ends to consist of secondary hydroxyl groups. In certain embodiments, such polyol compositions can be treated to increase the proportion of primary —OH end groups. This may be accomplished by reacting the secondary hydroxyl groups with reagents such as ethylene oxide, reactive lactones, and the like. In certain embodiments, polycarbonate polyol compositions are treated with beta lactones, caprolactone and the like to introduce primary hydroxyl end groups. In certain embodiments, polycarbonate polyol compositions are treated with ethylene oxide to introduce primary hydroxyl end groups.

In certain embodiments, polycarbonate polyols comprise a copolymer of $CO_2$ and one or more epoxides. In certain embodiments, polycarbonate polyols comprise a copolymer of $CO_2$ and ethylene oxide. In certain embodiments, polycarbonate polyols comprise a copolymer of $CO_2$ and propylene oxide. In certain embodiments, polycarbonate polyols comprise a copolymer of $CO_2$ and 1,2-butene oxide and/or 1,2-hexene oxide. In certain embodiments, polycarbonate polyols comprise a copolymer of $CO_2$ and cyclohexene oxide. In certain embodiments, polycarbonate polyols comprise a copolymer of $CO_2$ and cyclopentene oxide. In certain embodiments, polycarbonate polyols comprise a copolymer of $CO_2$ and 3-vinyl cyclohexene oxide. In certain embodiments, polycarbonate polyols comprise a copolymer of $CO_2$ and 3-ethyl cyclohexene oxide.

In certain embodiments, polycarbonate polyols comprise a terpolymer of $CO_2$ and ethylene oxide along with one or more additional epoxides selected from the group consisting of propylene oxide, 1,2-butene oxide, 2,3-butene oxide, cyclohexene oxide, 3-vinyl cyclohexene oxide, 3-ethyl cyclohexene oxide, cyclopentene oxide, epichlorohydrin, glycidyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In some embodiments, polycarbonate polyols comprise a copolymer of $CO_2$ and propylene oxide along with one or more additional epoxides selected from the group consisting of ethylene oxide, 1,2-butene oxide, 2,3-butene oxide, cyclohexene oxide, 3-vinyl cyclohexene oxide, cyclopentene oxide, epichlorohydrin, glycidyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, polycarbonate polyol compositions have a Mn in the range of 500 g/mol to about 100,000 g/mol. In some embodiments, Mn is measured by size-exclusion chromatography. In some embodiments, Mn is measured by gel permeation chromatography. In some embodiments, gel permeation chromatography comprises a polystyrene standard.

In certain embodiments, polycarbonate polyol compositions have a Mn less than about 100,000 g/mol. In certain embodiments, polycarbonate polyol compositions have a Mn between about 500 g/mol and about 50,000 g/mol. In certain embodiments, polycarbonate polyol compositions have a Mn between about 500 g/mol and about 40,000 g/mol. In certain embodiments, polycarbonate polyol compositions have a Mn less than about 25,000 g/mol. In certain embodiments, polycarbonate polyol compositions have a Mn between about 500 g/mol and about 20,000 g/mol. In certain embodiments, polycarbonate polyol compositions have a Mn between about 500 g/mol and about 10,000 g/mol. In certain embodiments, polycarbonate polyol compositions have a Mn between about 500 g/mol and about 5,000 g/mol. In certain embodiments, polycarbonate polyol compositions have a Mn between about 1,000 g/mol and about 5,000 g/mol. In certain embodiments, polycarbonate polyol compositions have a Mn between about 5,000 g/mol and about 10,000 g/mol. In certain embodiments, polycarbonate polyol compositions have a Mn between about 500 g/mol and about 1,000 g/mol. In certain embodiments, polycarbonate polyol compositions have a Mn between about 500 g/mol and about 2,000 g/mol. In certain embodiments, polycarbonate polyol compositions have a Mn between about 1,000 g/mol and about 3,000 g/mol. In certain embodiments, polycarbonate polyol compositions have a Mn of about 5,000 g/mol. In certain embodiments, polycarbonate polyol compositions have a Mn of about 4,000 g/mol. In certain embodiments, polycarbonate polyol compositions have a Mn of about 3,000 g/mol. In certain embodiments, polycarbonate polyol compositions have a Mn of about 2,500 g/mol. In certain embodiments, polycarbonate polyol compositions have a Mn of about 2,000 g/mol. In certain embodiments, polycarbonate polyol compositions have a Mn of about 1,500 g/mol. In certain embodiments, polycarbonate polyol compositions have a Mn of about 1,000 g/mol. In certain embodiments, polycarbonate polyol compositions have a Mn of about 750 g/mol. In certain embodiments, polycarbonate polyol compositions have a Mn of about 500 g/mol.

In certain embodiments, polycarbonate polyols used are characterized in that they have a narrow molecular weight distribution. This can be indicated by the polydispersity indices (PDI) of the polycarbonate polyols. In certain embodiments, polycarbonate polyol compositions (or a subcomponent thereof) have a PDI less than 3. In certain embodiments, polycarbonate polyol compositions (or a subcomponent thereof) have a PDI less than 2. In certain embodiments, polycarbonate polyol compositions (or a subcomponent thereof) have a PDI less than 1.8. In certain embodiments, polycarbonate polyol compositions (or a subcomponent thereof) have a PDI less than 1.5. In certain embodiments, polycarbonate polyol compositions (or a subcomponent thereof) have a PDI less than 1.4. In certain embodiments, polycarbonate polyol compositions (or a subcomponent thereof) have a PDI between about 1.0 and 1.2. In certain embodiments, polycarbonate polyol compositions (or a subcomponent thereof) have a PDI between about 1.0 and 1.1.

In certain embodiments, polycarbonate polyol compositions used do not have a narrow PDI. This can be the case if, for example, a polydisperse chain transfer agent is used to initiate an epoxide $CO_2$ copolymerization, or if a plurality of polycarbonate polyol compositions with different molecular weights are blended. In certain embodiments, polycarbonate polyol compositions (or a subcomponent thereof) have a PDI greater than 3. In certain embodiments, polycarbonate polyol compositions (or a subcomponent thereof) have a PDI greater than 2. In certain embodiments, polycarbonate polyol compositions (or a subcomponent thereof) have a PDI greater than 1.8. In certain embodiments, polycarbonate polyol compositions (or a subcomponent thereof) have a PDI greater than 1.5. In certain embodiments, polycarbonate polyol compositions (or a subcomponent thereof) have a PDI greater than 1.4.

In some embodiments, PDI is measured by size-exclusion chromatography. In some embodiments, PDI is measured by gel permeation chromatography. In some embodiments, gel permeation chromatography comprises a polystyrene standard.

In certain embodiments, polycarbonate polyols contain a high percentage of carbonate linkages and a low content of ether linkages. In some embodiments, the percentage of carbonate linkages may be determined by $^1H$ or $^{13}C$ NMR spectroscopy. In some embodiments, the percentage of carbonate linkages may be determined by infrared (IR) or Raman spectroscopy.

In certain embodiments, polycarbonate polyol compositions of the present invention comprise substantially alternating polymers containing a high percentage of carbonate linkages and a low content of ether linkages. In certain embodiments, polycarbonate polyol compositions of the present invention are characterized in that, on average in the composition, the percentage of carbonate linkages is 85% or greater. In certain embodiments, polycarbonate polyol compositions of the present invention are characterized in that, on average in the composition, the percentage of carbonate linkages is 90% or greater. In certain embodiments, polycarbonate polyol compositions of the present invention are characterized in that, on average in the composition, the percentage of carbonate linkages is 91% or greater. In certain embodiments, polycarbonate polyol compositions of the present invention are characterized in that, on average in the composition, the percentage of carbonate linkages is 92% or greater. In certain embodiments, polycarbonate polyol compositions of the present invention are characterized in that, on average in the composition, the percentage of carbonate linkages is 93% or greater. In certain embodiments, polycarbonate polyol compositions of the present invention are characterized in that, on average in the composition, the percentage of carbonate linkages is 94% or greater. In certain embodiments, polycarbonate polyol compositions of the present invention are characterized in that, on average in the composition, the percentage of carbonate linkages is 95% or greater. In certain embodiments, polycarbonate polyol compositions of the present invention are characterized in that, on average in the composition, the percentage of carbonate linkages is 96% or greater. In certain embodiments, polycarbonate polyol compositions of the present invention are characterized in that, on average in the composition, the percentage of carbonate linkages is 97% or greater. In certain embodiments, polycarbonate polyol compositions of the present invention are characterized in that, on average in the composition, the percentage of carbonate linkages is 98% or greater. In certain embodiments, polycarbonate polyol compositions of the present invention are characterized in that, on average in the composition, the percentage of carbonate linkages is 99% or greater. In certain embodiments, polycarbonate polyol compositions of the present invention are characterized in that, on average in the composition, the percentage of carbonate linkages is 99.5% or greater. Unless otherwise stated, the percentages above exclude ether linkages present in polymerization initiators or chain transfer agents and refer only to the linkages formed during epoxide $CO_2$ copolymerization.

In certain embodiments, polycarbonate polyol compositions are characterized in that they contain essentially no ether linkages either within the polymer chains derived from epoxide $CO_2$ copolymerization or within any polymerization initiators, chain transfer agents, or end groups that may be present in the polymer. In certain embodiments, polycarbonate polyol compositions are characterized in that they contain, on average, less than one ether linkage per polymer chain within the composition. In certain embodiments, polycarbonate polyol compositions are characterized in that they contain essentially no ether linkages.

In certain embodiments, where a polycarbonate polyol is derived from mono-substituted epoxides (e.g. such as propylene oxide, 1,2-butylene oxide, epichlorohydrin, epoxidized alpha olefins, or a glycidol derivative), the polycarbonate polyol is characterized in that it is regioregular. Regioregularity may be expressed as the percentage of adjacent monomer units that are oriented in a head-to-tail arrangement within the polymer chain. In certain embodiments, polycarbonate polyols have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13 NMR spectroscopy.

In certain embodiments, polycarbonate polyols comprise polyol chains having a structure P1:

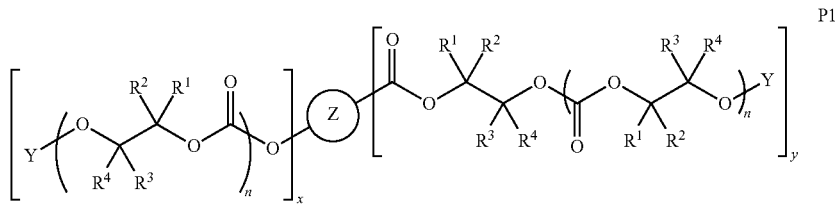

wherein,
- $R^1$, $R^2$, $R^3$, and $R^4$ are, at each occurrence in the polymer chain, independently selected from the group consisting of hydrogen, fluorine, an optionally substituted $C_{1-12}$ aliphatic group, an optionally substituted $C_{1-12}$ heteroaliphatic group, and an optionally substituted phenyl group, where any two or more of $R^1$, $R^2$, $R^3$, and $R^4$ may optionally be taken together with intervening atoms to form one or more optionally substituted 3- to 12-membered rings optionally containing one or more heteroatoms;
- Y is, at each occurrence, independently —H or a site of attachment to any of the chain-extending moieties bearing hydroxyl groups;
- n is at each occurrence, independently an integer from about 2 to about 50;

is a covalent bond or a multivalent moiety; and
- x and y are each independently an integer from 0 to 6, where the sum of x and y is between 2 and 6.

In some embodiments, $R^1$, $R^2$, $R^3$, and $R^4$ are, independently at each occurrence in the polymer chain, selected from the group consisting of hydrogen and optionally substituted $C_1$-$C_6$ aliphatic. In some embodiments, $R^1$, $R^2$, $R^3$, and $R^4$ are, independently at each occurrence in the polymer chain, selected from the group consisting of hydrogen and methyl.

In some embodiments Y is —H.

In certain embodiments, the multivalent moiety

embedded within the polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in published PCT application WO 2010/028362. In certain embodiments, such copolymerizations are performed as exemplified in US 2011/0245424. In certain embodiments, such copolymerizations are performed as exemplified in Green Chem. 2011, 13, 3469-3475.

In certain embodiments, polycarbonate polyols are derived from the copolymerization of one or more epoxides with $CO_2$ in the presence of such polyfunctional chain transfer agents as shown in Scheme 1:

Scheme 1

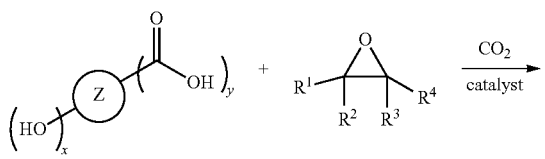

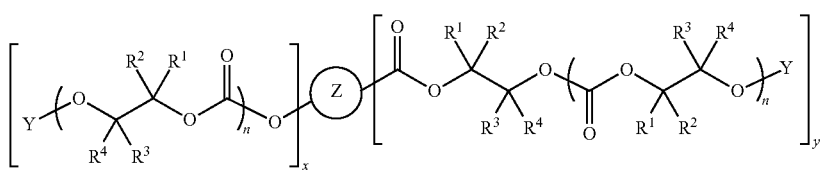

P1

In certain embodiments, polycarbonate polyols have a structure of Formula P2:

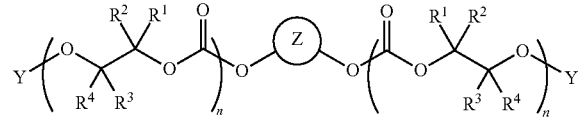

P2 wherein each of $R^1$, $R^2$, $R^3$, $R^4$, Y,

and n is as defined above and described in the classes and subclasses herein, both singly and in combination.

In certain embodiments where polycarbonate polyol chains have a structure P2,

is derived from a dihydric alcohol. In such instances

represents the carbon-containing backbone of the dihydric alcohol, while the two oxygen atoms adjacent to

are derived from the —OH groups of the diol. For example, if the polyfunctional chain transfer agent were ethylene glycol, then

would be —CH$_2$CH$_2$— and P2 would have the following structure:

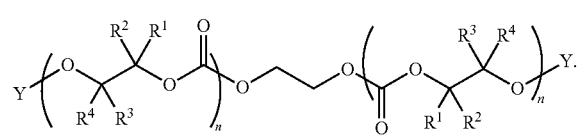

In certain embodiments where

is derived from a dihydric alcohol, the dihydric alcohol comprises a $C_{2\text{-}40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycol), such as those having number average molecular weights of from 234 to about 2000 g/mol.

In some embodiments,

is derived from dipropylene glycol.

In certain embodiments, where

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, polyoxymethylene polymers, and alkoxylated analogs of any of these. In certain embodiments, a polymeric diol has an average molecular weight less than about 2000 g/mol. In some embodiments, a polymeric diol has an average molecular weight of between about 500 g/mol and about 1,500 g/mol. In some embodiments, a polymeric diol has an average molecular weight of between about 750 g/mol and about 1,250 g/mol. In some embodiments, a polymeric diol has an average molecular weight of between about 900 g/mol and about 1,100 g/mol. In some embodiments, a polymeric diol has an average molecular weight of about 1,000 g/mol.

In some embodiments, a polymeric diol is a polyether. In some embodiments, a polymeric diol is polyethylene glycol. In some embodiments, a polymeric diol is polypropylene glycol. In some embodiments, a polymeric diol is a polyester.

In certain embodiments,

is derived from a hydroxy acid.

In certain embodiments,

is derived from a dicarboxylic acid.

In certain embodiments,

is derived from a phosphorous-containing molecule.

In certain embodiments, each

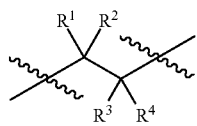

in the structures herein is independently selected from the group consisting of:

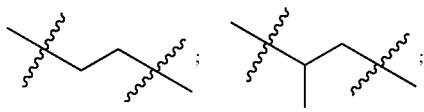

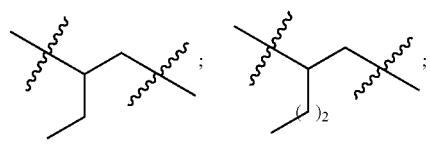

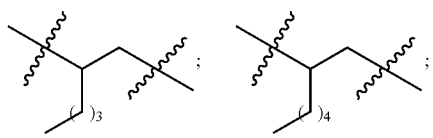

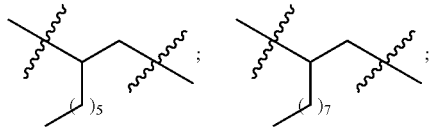

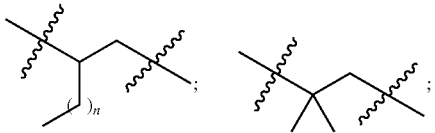

n = 9-30

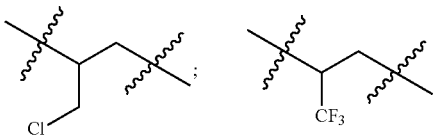

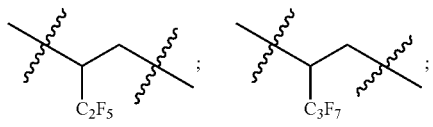

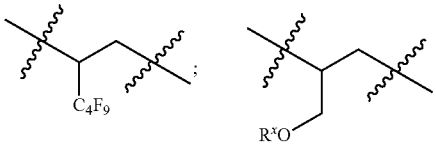

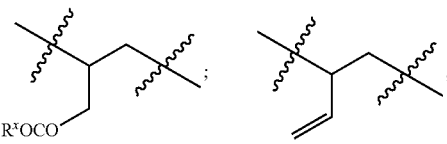

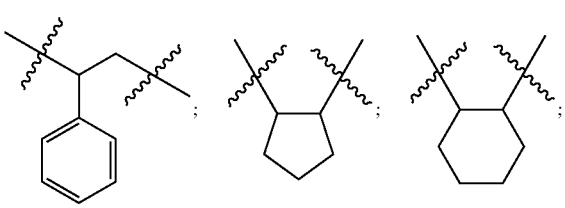

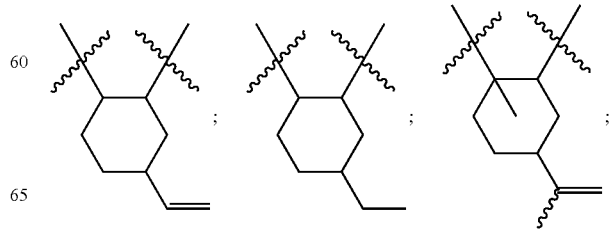

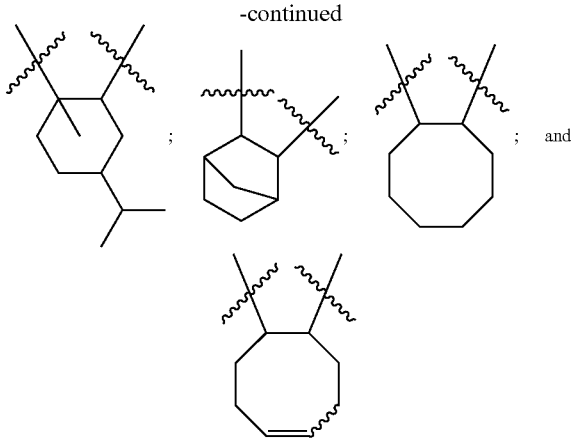

wherein each R$^x$ is independently an optionally substituted moiety selected from the group consisting of C$_{2-20}$ aliphatic, C$_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

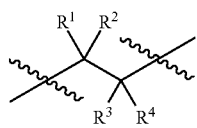

in the structures herein is independently selected from the group consisting of:

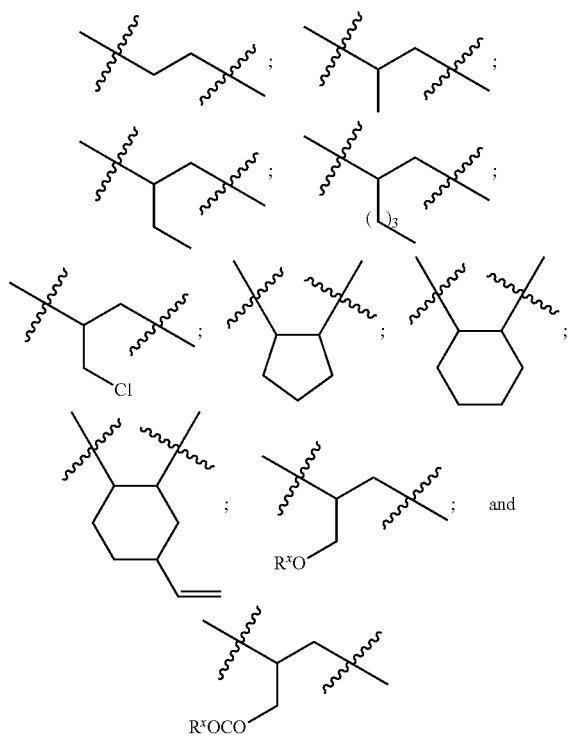

wherein R$^x$ is as defined above and described in classes and subclasses herein.

In some embodiments, Y is a site of attachment to any of the chain-extending moieties bearing hydroxyl groups. Such chain-extending moieties can be used to modulate the end group reactivity of the polymer chains (e.g., by incorporating primary hydroxyl or other groups). In certain embodiments, —Y comprises an ester linkage to an optionally substituted C$_{2-40}$ linker comprising (e.g., terminated with) an —OH group. In certain embodiments, —Y is selected from the group consisting of:

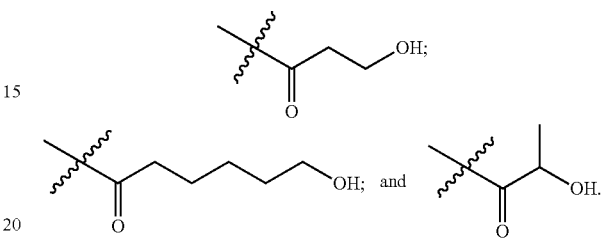

In certain embodiments, the moiety —Y in the structures herein comprises a hydroxy-terminated polymer. In certain embodiments, —Y comprises a hydroxy-terminated polyether. In certain embodiments, —Y comprises

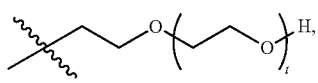

where t is an integer from 1 to 20.

In certain embodiments, —Y comprises a hydroxy-terminated polyester. In certain embodiments, —Y is selected from the group consisting of:

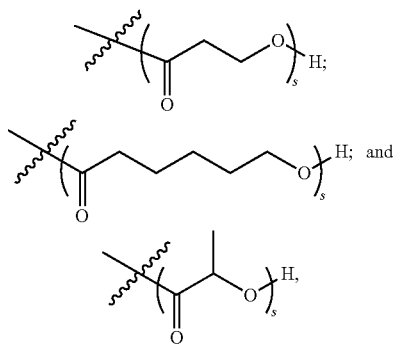

where s is an integer from 2 to 20.

In certain embodiments, polycarbonate polyols comprise polyol chains having a structure:

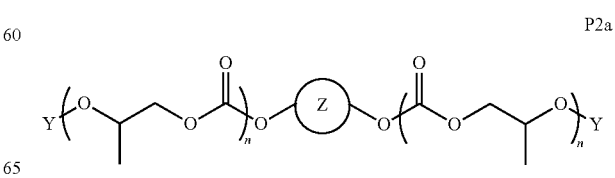

P2a wherein each of

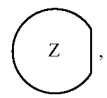

—Y, and n is as defined above and described in classes and subclasses herein.

In certain embodiments, in polycarbonate polyols of structures P2a,

is selected from the group consisting of: ethylene glycol; diethylene glycol, triethylene glycol, 1,3 propane diol; 1,4 butane diol, hexylene glycol, 1,6 hexane diol, neopentyl glycol, propylene glycol, dipropylene glycol, tripropylene glycol, and alkoxylated derivatives of any of these.

In certain embodiments, polycarbonate polyols comprise:

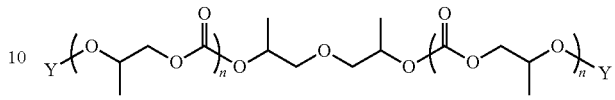

P2b wherein each of —Y and n is as defined above and described in classes and subclasses herein.

In certain embodiments, in polycarbonates of structures P2a and P2b, —Y is —H.

In certain embodiments, polycarbonate polyols are selected from the group consisting of Q1, Q2, Q3, Q4, Q5, Q6, and mixtures of any two or more of these.

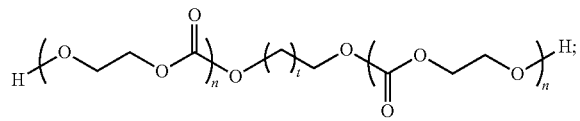

Q1

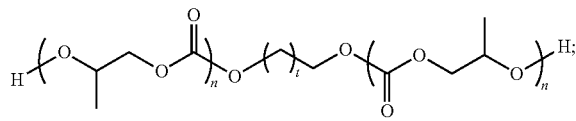

Q2

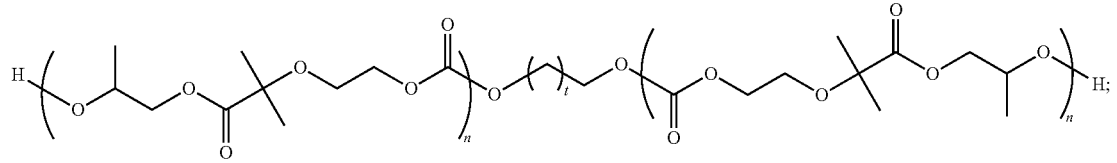

Q3

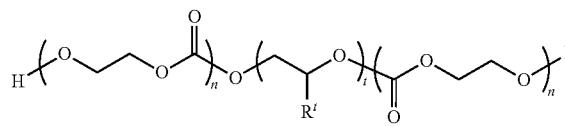

Q4

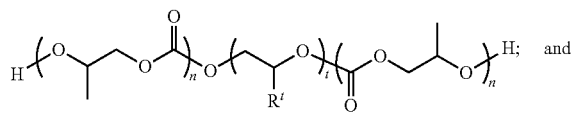

Q5 and

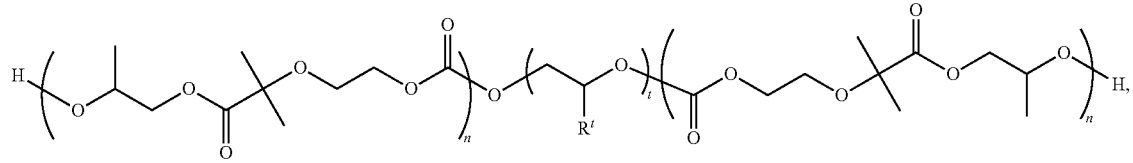

Q6 wherein, t is an integer from 1 to 12 inclusive, and R' is independently at each occurrence —H, or —CH₃.

In certain embodiments, a polycarbonate polyol is selected from the group consisting of:

Poly(ethylene carbonate) of formula Q1 having an average molecular weight number of between about 500 g/mol and about 3,000 g/mol, a polydispersity index less than about 1.25, at least 85% carbonate linkages, and at least 98% —OH end groups;

Poly(ethylene carbonate) of formula Q1 having an average molecular weight number of about 500 g/mol, a polydispersity index less than about 1.25, at least 85% carbonate linkages, and at least 98% —OH end groups;

Poly(ethylene carbonate) of formula Q1 having an average molecular weight number of about 1,000 g/mol, a polydispersity index less than about 1.25, at least 85% carbonate linkages, and at least 98% —OH end groups;

Poly(ethylene carbonate) of formula Q1 having an average molecular weight number of about 2,000 g/mol, a polydispersity index less than about 1.25, at least 85% carbonate linkages, and at least 98% —OH end groups;

Poly(ethylene carbonate) of formula Q1 having an average molecular weight number of about 3,000 g/mol, a polydispersity index less than about 1.25, at least 85% carbonate linkages, and at least 98% —OH end groups;

Poly(propylene carbonate) of formula Q2 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q2 having an average molecular weight number of about 500 g/mol, a polydispersity index less than about 1.25, at least 95% carbonate linkages, and at least 98% —OH end groups;

Poly(propylene carbonate) of formula Q2 having an average molecular weight number of about 1,000 g/mol, a polydispersity index less than about 1.25, at least 95% carbonate linkages, and at least 98% —OH end groups;

Poly(propylene carbonate) of formula Q2 having an average molecular weight number of about 2,000 g/mol, a polydispersity index less than about 1.25, at least 95% carbonate linkages, and at least 98% —OH end groups;

Poly(propylene carbonate) of formula Q2 having an average molecular weight number of about 3,000 g/mol, a polydispersity index less than about 1.25, at least 95% carbonate linkages, and at least 98% —OH end groups;

Poly(ethylene-co-propylene carbonate) of formula Q3 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q3 having an average molecular weight number of about 500 g/mol, a polydispersity index less than about 1.25, at least 90% carbonate linkages, and at least 98% —OH end groups;

Poly(ethylene-co-propylene carbonate) of formula Q3 having an average molecular weight number of about 1,000 g/mol, a polydispersity index less than about 1.25, at least 90% carbonate linkages, and at least 98% —OH end groups;

Poly(ethylene-co-propylene carbonate) of formula Q3 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q3 having an average molecular weight number of about 3,000 g/mol, a polydispersity index less than about 1.25, at least 95% carbonate linkages, and at least 98% —OH end groups;

Poly(ethylene carbonate) of formula Q4 having an average molecular weight number of between about 500 g/mol and about 3,000 g/mol (e.g. each n is between about 4 and about 16), a polydispersity index less than about 1.25, at least 95% carbonate linkages, and at least 98% —OH end groups;

Poly(ethylene carbonate) of formula Q4 having an average molecular weight number of about 500 g/mol, a polydispersity index less than about 1.25, at least 85% carbonate linkages, and at least 98% —OH end groups;

Poly(ethylene carbonate) of formula Q4 having an average molecular weight number of about 1,000 g/mol, a polydispersity index less than about 1.25, at least 85% carbonate linkages, and at least 98% —OH end groups;

Poly(ethylene carbonate) of formula Q4 having an average molecular weight number of about 2,000 g/mol, a polydispersity index less than about 1.25, at least 85% carbonate linkages, and at least 98% —OH end groups;

Poly(ethylene carbonate) of formula Q4 having an average molecular weight number of about 3,000 g/mol, a polydispersity index less than about 1.25, at least 85% carbonate linkages, and at least 98% —OH end groups.

Poly(propylene carbonate) of formula Q5 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q5 having an average molecular weight number of about 500 g/mol, a polydispersity index less than about 1.25, at least 95% carbonate linkages, and at least 98% —OH end groups;

Poly(propylene carbonate) of formula Q5 having an average molecular weight number of about 1,000 g/mol, a polydispersity index less than about 1.25, at least 95% carbonate linkages, and at least 98% —OH end groups;

Poly(propylene carbonate) of formula Q5 having an average molecular weight number of about 2,000 g/mol, a polydispersity index less than about 1.25, at least 95% carbonate linkages, and at least 98% —OH end groups;

Poly(propylene carbonate) of formula Q5 having an average molecular weight number of about 3,000 g/mol, a polydispersity index less than about 1.25, at least 95% carbonate linkages, and at least 98% —OH end groups;

Poly(ethylene-co-propylene carbonate) of formula Q6 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q6 having an average molecular weight number of about 500 g/mol, a polydispersity index less than about 1.25, at least 90% carbonate linkages, and at least 98% —OH end groups;

Poly(ethylene-co-propylene carbonate) of formula Q6 having an average molecular weight number of about 1,000 g/mol, a polydispersity index less than about 1.25, at least 90% carbonate linkages, and at least 98% —OH end groups;

Poly(ethylene-co-propylene carbonate) of formula Q6 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q6 having an average molecular weight number of about 3,000 g/mol, a polydispersity index less than about 1.25, at least 95% carbonate linkages, and at least 98% —OH end groups; and Mixtures of any two or more of these.

In certain embodiments, a polycarbonate polyols has a structure of formula

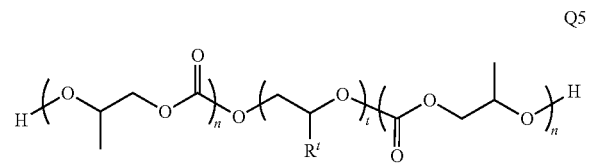

Q5 wherein, t is an integer from 1 to 12 inclusive, and R' is independently at each occurrence —H, or —CH₃.

In certain embodiments, a polycarbonate polyol is selected from the group consisting of:

Poly(propylene carbonate) of formula Q5 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q5 having an average molecular weight number of about 500 g/mol, a polydispersity index less than about 1.25, at least 95% carbonate linkages, and at least 98% —OH end groups;

Poly(propylene carbonate) of formula Q5 having an average molecular weight number of about 1,000 g/mol, a polydispersity index less than about 1.25, at least 95% carbonate linkages, and at least 98% —OH end groups;

Poly(propylene carbonate) of formula Q5 having an average molecular weight number of about 2,000 g/mol, a polydispersity index less than about 1.25, at least 95% carbonate linkages, and at least 98% —OH end groups;

Poly(propylene carbonate) of formula Q5 having an average molecular weight number of about 3,000 g/mol, a polydispersity index less than about 1.25, at least 95% carbonate linkages, and at least 98% —OH end groups; and mixtures of any two or more of these.

In certain embodiments, the $$\boxed{Z}$$

in the embedded chain transfer agent is a moiety derived from a polymeric diol or higher polyhydric alcohol. In certain embodiments, such polymeric alcohols are polyether or polyester polyols. In certain embodiments $$\boxed{Z}$$

is a polyether polyol comprising ethylene glycol or propylene glycol repeating units (—OCH₂CH₂O—, or —OCH₂CH(CH₃)O—) or combinations of these. In certain embodiments, $$\boxed{Z}$$

is a polyester polyol comprising the reaction product of a diol and a diacid, or a material derived from ring-opening polymerization of one or more lactones.

In certain embodiments, a polycarbonate polyol has a structure of formula

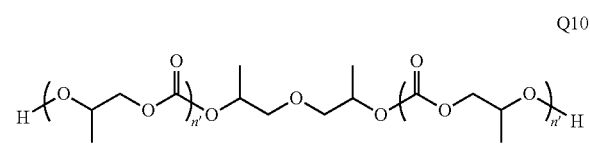

Q10 wherein each n' is, at each occurrence, independently an integer from about 2 to about 50.

In some embodiments, each n' is, at each occurrence, independently an integer from about 2 to about 20, from about 2 to about 15, from about 2 to about 10, from about 3 to about 7, or from about 4 to about 5. In some embodiments, the sum of the n' moieties within each polymer chain is between about 6 to about 12, between about 7 to about 11, between about 8 to about 10, or about 9.

In some embodiments, a polycarbonate polyol has a structure of formula Q10 and an OH# of between about 105 and about 120, or an OH# of about 112.

B. Nanofiller

The physical and chemical properties of polymers can be altered through nanofiller incorporation to produce polymer nanocomposites, and three common methods to prepare polymer nanocomposites are in-situ polymerization, solution intercalation and melt intercalation (Gacitua, William, Aldo Ballerini, and Jinwen Zhang. "Polymer nanocomposites: synthetic and natural fillers a review." *Maderas. Ciencia y tecnologia* 7.3 (2005): 159-178). Certain nanocomposites of polycarbonates have been found to possess improved properties such as lowering the gas permeability, enhancing the mechanical strength, and thermal stability (Muthuraj, Rajendran, and Tizazu Mekonnen. "Carbon dioxide-derived poly (propylene carbonate) as a matrix for composites and nanocomposites: performances and applications." *Macromolecular Materials and Engineering* 303.11 (2018): 1800366), however, a reduction in polycarbonate viscosity by the incorporation of nanofillers is not known and is in fact unexpected based upon literature precedent (supra).

In certain embodiments, a nanocomposite composition of the present invention comprises a polycarbonate polyol component and a nanofiller component. In some embodiments, a nanofiller component comprises a nanoclay, a carbon nanofiller, a metal oxide, a metallic particle, a polymer nanofiber, a natural fiber, or mixtures thereof.

In certain embodiments, a nanofiller comprises carbon nanofillers. Exemplary carbon nanofillers include, but are not limited to, carbon nanotubes, graphene, graphite, fullerenes, carbon fibers.

In certain embodiments, a nanofiller comprises metals oxides or metallic particles. Exemplary metal oxides include, but are not limited to, copper (I) oxide, copper (II) oxide, cadmium oxide, aluminum oxide, magnesium oxide, cerium (IV) oxide, zirconium oxide, titanium (IV) oxide, zinc oxide, iron (III) oxide, iron (II, III) oxide, tin (II) oxide, nickel (II) oxide. Exemplary metallic particles include, but are not limited to, gold, silver, copper, platinum, palladium, ruthenium, rhenium, zinc, mercury, rhodium, cobalt, nickel, lithium, iron, chromium.

In certain embodiments, a nanofiller comprises natural fibers. Exemplary natural fibers include, but are not limited to, sisal, cellulose, flax, hemp, kenaf, banana, wood, pineapple.

In certain embodiments, a nanofiller comprises a nanoclay. In some embodiments, a nanoclay comprises a natural or synthetic nanoclay. In some embodiments, a nanoclay comprises a layered silicate or nonlayered silicate.

In certain embodiments, a nanoclay is a phyllosilicate. Exemplary phyllosilicates include, but are not limited to, kaolinite, dickite, nacrite, halloysite, lizardite, amesite, berthierine, cronstedtite, nepouite, kellyite, fraipontite, brindleyite, montmorillonite, beidellite, nontronite, volkonskoite, saponite, hectorite, sauconite, stevensite, swinefordite, illite, glauconite, brammallite, wonesite, trioctahedral vermiculite, dioctahedral vermiculite, palygorskite, loughlinite, falcondoite, yofortierite, brinrobersite, aliettite, kulkeite, rectorite, hydrobiotite, corrensite, tosudite In certain embodiments, a nanoclay is not sepiolite.

In certain embodiments, a nanoclay is selected from the smectite clay mineral group. In some embodiments, a nanoclay is montmorillonite.

Untreated clays generally have sheet-like structures, due in part to the presence of rings of tetrahedrons linked by oxygen atoms and shared with other rings in a two-dimensional plane. Layers of cations, such as sodium ions, connect the sheet-like structures. These layers of cations that connect the sheet-like structures are hereinafter referred to as interlayers. The cations are weakly bonded and are surrounded by neutral molecules, such as water molecules. The distance between the layers of sheet-like structures is referred to as the "d-spacing". The silicon to oxygen ratio in the untreated clay is generally from about 1:1 to about 2.5:1. The cohesive energy between interlayers is relatively strong, and unless treated suitably, may not allow the entry of organic polymer molecules between the layers of the untreated clay.

In certain embodiments, a nanoclay may be converted into a modified nanoclay by treating the nanoclay with at least one suitable functionalizing agent. This facilitates separation of the sheet-like structures into individual nanoclay platelets. Separating platelets prior to incorporation into a polymer matrix also improves the polymer/platelet interface. Any treatment that achieves the above goals may be used. Known nanoclay treatments used to modify a nanoclay for the purpose of improving dispersion of nanoclay materials may be used. This conversion or functionalization may be conducted prior to, or during, mixing the clay material with the polymer.

In certain embodiments, suitable functionalizing agents can increase the d-spacing so as to facilitate incorporation of polymer molecules. The functionalizing agent also serves to compatibilize the interlayers of the untreated nanoclay with polymer molecules to form a polymer nanocomposite. In some embodiments, functionalization can be carried out by using functionalizing agents and by employing methods generally known to a person skilled in the art. In some embodiments, functionalization is achieved by a cation exchange reaction between an untreated nanoclay and a functionalizing agent. In some embodiments, a functionalizing agent is used in an amount that is twice an experimentally measured exchange capacity of an untreated nanoclay. In some embodiments, a functionalizing agent is dissolved in a solvent, such as an alcohol-water mixture (e.g., 50:50 v/v) followed by the addition of an untreated nanoclay. The mixture thus formed is heated for a sufficient time to obtain a modified nanoclay.

In certain embodiments, suitable functionalizing agents include, but are not limited to, ammonium salts, polyalkylammonium salts, polyalkylaminopyridinium salts, polyalkylguanidinium salts, polyalkylimidazolium salts, polyalkylbenzimidazolium salts, phosphonium salts, sulfonium salts, and mixtures thereof. Exemplary polyalkylammonium salts include, but are not limited to, tetramethylammonium, tetrapropylammonium, hexylammonium, bis(2-hydroxyethyl)dimethylammonium, hexadecyltrimethylammonium (cetyltrimethylammonium), octadecyltrimethylammonium (trimethylstearylammonium), bis(2-hydroxyethyl)octadecylmethylammonium, octadecylbenzyldimethylammonium. Exemplary polyalkylaminopyridinium salts include, but are not limited to, p-dimethylamino-N-methylpyridinium salts, o-dimethylaminopyridinium salts. Exemplary polyalkylguanidinium salts include, but are not limited to, hexaalkylguanidinium salts and the like. Exemplary polyalkylimidazolium salts include N,N'-dioctadecylimidazolium, N,N'-dihexadecylimiazolium, 1,2 dimethyl-3-hexadecylimidazolium, 1-decyl-2,3-dimethylimidazolium, 1-butyl-2,3-dimethylimidazolium, 1,2-dimethyl-3-propylimidazolium, 1,2-dimethyl-3-hexadecylimidazolium, N,N'-dioctadecylbenzimidazolium, N,N'-dihexadecylbenzimidazolium. Exemplary phosphonium salts include, but are not limited to, triphenyldodecylphosphonium bromide, tributylhexadecylphosphonium bromide, tetraphenylphosphonium bromide, tetraoctylphosphonium bromide.

C. Nanocomposite Compositions

As described above and herein, in one aspect, the present invention encompasses a nanocomposite composition comprising a polycarbonate polyol and a nanofiller, wherein the polycarbonate polyol comprises:
 (a) a polycarbonate polyol derived from copolymerization of $CO_2$ and one or more epoxides; and/or
 (b) an aliphatic polycarbonate polyol.

In certain embodiments, a polycarbonate polyol of a nanocomposite composition comprises a polycarbonate polyol as described above and herein.

In certain embodiments, a nanofiller of a nanocomposite composition comprises any of the nanofillers described and herein. In some embodiments, a nanofiller of a nanocomposite composition comprises any of the nanoclays described and herein.

In certain embodiments, a nanoclay of a nanocomposite composition comprises about 1 to about 10 wt % of the nanocomposite. In some embodiments, a nanoclay of a nanocomposite composition comprises about 2 to about 8 wt % of the nanocomposite. In some embodiments, a nanoclay of a nanocomposite composition comprises about 3 to about 7 wt % of the nanocomposite. In some embodiments, a nanoclay of a nanocomposite composition comprises about 3 to about 6 wt % of the nanocomposite. In some embodiments, a nanoclay of a nanocomposite composition comprises about 3 to about 5 wt % of the nanocomposite. In some embodiments, a nanoclay of a nanocomposite composition comprises about 4 wt % of the nanocomposite.

In some embodiments, a nanoclay of a nanocomposite composition is intercalated. In some embodiment, a nanoclay of a nanocomposite composition is exfoliated.

II. Nanocomposite Compositions with Improved Properties

In one aspect, the present invention encompasses a nanocomposite composition comprising a polycarbonate polyol and a nanofiller, unexpectedly demonstrating improved properties (e.g., lower viscosity), as compared to the neat polycarbonate polyol.

In certain embodiments, an improved property is lower viscosity when measured by an oscillatory rheometer according to ASTM D7175, ASTM D7483, or the procedure described in Example 2.

In certain embodiments, a provided nanocomposite composition is characterized in that the viscosity when measured by an oscillatory rheometer according to ASTM D7175, ASTM D7483, or the procedure described in Example 2 is improved (e.g., lower) compared to a neat polycarbonate polyol. In some embodiments, a provided nanocomposite composition is characterized in that the viscosity is at least 10, 20, 30, 40, 50, 60, 70, 80, 90, 99% lower as compared to a neat polycarbonate polyol.

In certain embodiments, a provided nanocomposite composition is characterized in that the viscosity when measured by an oscillatory rheometer according to ASTM D7175, ASTM D7483, or the procedure described in Example 2 is less than about 20,000 cP. In some embodiments, a provided nanocomposite composition is characterized in that the viscosity is less than about 10,000, 9,000, 8,000, 7,000, 6,000, 5,000, 4,000, 3,000, 2,000, 1,000, 900, 800, 700, 600, or 500 cP. In some embodiments, a provided nanocomposite composition is characterized in that the viscosity is less than about 10,000 cP. In some embodiments, a provided nanocomposite composition is characterized in that the viscosity is less than about 5,000 cP. In some embodiments, a provided nanocomposite composition is characterized in that the viscosity is less than about 1,000 cP. In some embodiments, a provided nanocomposite composition is characterized in that the viscosity is less than about 500 cP.

In certain embodiments, a provided nanocomposite composition is characterized in that the viscosity when measured by an oscillatory rheometer according to ASTM D7175, ASTM D7483, or the procedure described in Example 2 is about 200 to about 20,000 cP. In some embodiments, a provided nanocomposite composition is characterized in that the viscosity is about 200 to about 10,000 cP. In some embodiments, a provided nanocomposite composition is characterized in that the viscosity is about 200 to about 9,000 cP. In some embodiments, a provided nanocomposite composition is characterized in that the viscosity is about 200 to about 8,000 cP. In some embodiments, a provided nanocomposite composition is characterized in that the viscosity is about 200 to about 7,000 cP. In some embodiments, a provided nanocomposite composition is characterized in that the viscosity is about 200 to about 6,000 cP. In some embodiments, a provided nanocomposite composition is characterized in that the viscosity is about 200 to about 5,000 cP. In some embodiments, a provided nanocomposite composition is characterized in that the viscosity is about 200 to about 4,000 cP. In some embodiments, a provided nanocomposite composition is characterized in that the viscosity is about 200 to about 3,000 cP. In some embodiments, a provided nanocomposite composition is characterized in that the viscosity is about 200 to about 2,000 cP. In some embodiments, a provided nanocomposite composition is characterized in that the viscosity is about 200 to about 1,000 cP. In some embodiments, a provided nanocomposite composition is characterized in that the viscosity is about 200 to about 500 cP.

III. Methods for Preparing Nanocomposite Compositions

In one aspect, the present invention provides a method of preparing a nanocomposite composition, the method comprising the steps of:

(a) providing a polycarbonate polyol,
  wherein the polycarbonate polyol comprises:
    (i) a polycarbonate polyol derived from copolymerization of $CO_2$ and one or more epoxides; or
    (ii) an aliphatic polycarbonate polyol;
(b) providing a nanofiller; and
(c) mixing compositions at steps (a) and (b), and allowing the mixture to form a nanocomposite composition.

In certain embodiments, a method of preparing a nanocomposite composition comprises the steps of:

(a) providing a polycarbonate polyol,
  wherein the polycarbonate polyol comprises:
    (i) a polycarbonate polyol derived from copolymerization of $CO_2$ and one or more epoxides; or
    (ii) an aliphatic polycarbonate polyol;
(b) providing a nanofiller; and
(c) mixing compositions at steps (a) and (b), and allowing the mixture to form a nanocomposite composition at an elevated temperature.

In some embodiments, the method comprises heating a polycarbonate polyol and a modified nanofiller to about 80.0° C.

In certain embodiments, a method of preparing a nanocomposite composition comprises the steps of:

(a) providing a polycarbonate polyol,
  wherein the polycarbonate polyol comprises:
    (i) a polycarbonate polyol derived from copolymerization of $CO_2$ and one or more epoxides; or
    (ii) an aliphatic polycarbonate polyol;
(b) providing a modified nanofiller; and
(c) mixing compositions at steps (a) and (b), and allowing the mixture to form a nanocomposite composition via solution intercalation.

IV. Methods of Improving Properties of Nanocomposite Compositions

In one aspect, the present invention encompasses a method of improving properties of a carbonate polyol, the method comprising the step of forming a nanocomposite composition comprising i) the polycarbonate polyol and ii) a nanofiller. In some embodiments, such methods provide a nanocomposite composition as described in section II (supra).

In certain embodiments, an improved property is lower viscosity when measured by an oscillatory rheometer according to ASTM D7175, ASTM D7483, or the procedure described in Example 2.

EXEMPLARY EMBODIMENTS

The following numbered embodiments, while non-limiting, are exemplary of certain aspects of the present disclosure:

1. A nanocomposite composition comprising a polycarbonate polyol and a nanofiller,
  wherein the polycarbonate polyol comprises
    (a) a polycarbonate polyol derived from copolymerization of carbon dioxide
      ($CO_2$) and one or more epoxides, or
    (b) an aliphatic polycarbonate polyol.

2. The nanocomposite composition according to embodiment 1, wherein the polycarbonate polyol comprises polyol chains having a structure of P1:

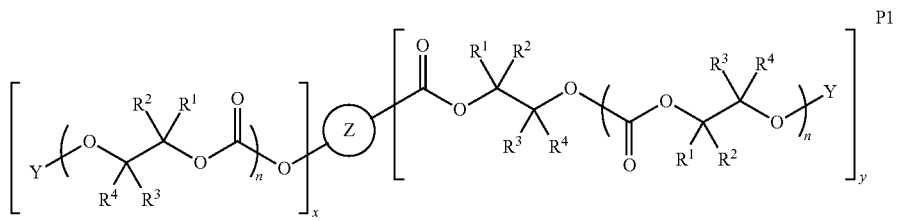

wherein, $R^1$, $R^2$, $R^3$, and $R^4$ are, independently at each occurrence in the polymer chain, selected from the group consisting of hydrogen and optionally substituted $C_1$-$C_6$ aliphatic;

Y is, at each occurrence, —H or the site of attachment to a chain-extending moiety bearing a hydroxyl group;

n is at each occurrence, independently an integer from about 2 to about 50;

is a covalent bond or a multivalent moiety; and x and y are each independently an integer from 0 to 6, where the sum of x and y is between 2 and 6.

3. The nanocomposite composition according to embodiment 2, wherein $R^1$, $R^2$, $R^3$, and $R^4$ are, independently at each occurrence in the polymer chain, selected from the group consisting of hydrogen and methyl.

4. The nanocomposite composition according to embodiment 2 or 3, where

is derived from a dihydric alcohol.

5. The nanocomposite composition according to embodiment 4, wherein the dihydric alcohol is selected from the group consisting of diethylene glycol, triethylene glycol, tetraethylene glycol, poly(ethylene glycol) having a Mn of about 220 to about 2000 g/mol, dipropylene glycol, tripropylene glycol, and poly(propylene glycol) having a Mn between about 234 and about 2000 g/mol.

6. The nanocomposite composition according to embodiment 5, wherein the dihydric alcohol is dipropylene glycol.

7. The nanocomposite composition according to any one of embodiments 1-6, wherein the polycarbonate polyol comprises polyol chains having a structure of P2b:

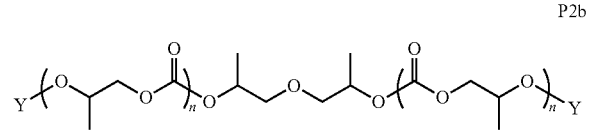

wherein,

Y is, at each occurrence, —H or the site of attachment to a chain-extending moiety bearing a hydroxyl group; and n is at each occurrence, independently an integer from about 2 to about 50.

7A. The nanocomposite composition according to any one of embodiments 1-7, wherein the polycarbonate polyol comprises polyol chains having a structure of Q10:

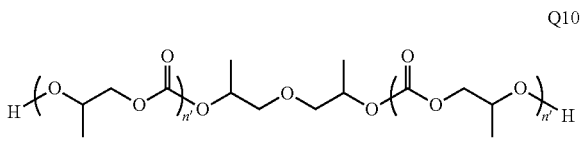

wherein each n' is, at each occurrence, independently an integer from about 2 to about 50.

8. The nanocomposite composition according to any one of the preceding embodiments, wherein the nanofiller is a modified nanoclay.

9. The nanocomposite composition according to embodiment 8, wherein the nanoclay is montmorillonite.

9A. The nanocomposite composition according to embodiment 8, wherein the nanoclay is not sepiolite.

10. The nanocomposite composition according to embodiment 8, 9, or 9A, wherein the modified nanoclay is modified by an ion-exchange reaction, wherein the inorganic nanoclay is treated with a functionalizing agent selected from ammonium salts, tetrapropylammonium salts, cetyltrimethylammonium salts, and trimethylstearylammonium salts.

11. The nanocomposite composition according to any one of embodiments 8-10, wherein the modified nanoclay comprises about 1 to about 10 wt % of the nanocomposite.

12. The nanocomposite composition according to any one of embodiments 8-10, wherein the modified nanoclay comprises about 2 to about 8 wt % of the nanocomposite.

13. The nanocomposite composition according to any one of embodiments 8-10, wherein the modified nanoclay comprises about 3 to about 7 wt % of the nanocomposite.

14. The nanocomposite composition according to any one of embodiments 8-10, wherein the modified nanoclay comprises about 3 to about 6 wt % of the nanocomposite.

15. The nanocomposite composition according to any one of embodiments 8-10, wherein the modified nanoclay comprises about 3 to about 5 wt % of the nanocomposite.

16. The nanocomposite composition according to any one of embodiments 8-10, wherein the modified nanoclay comprises about 4 wt % of the nanocomposite.

17. The nanocomposite composition according to any one of embodiments 8-16, wherein the nanoclay is exfoliated.

18. The nanocomposite composition according to any one of the preceding embodiments, wherein the nanocomposite composition is characterized in that a performance property is improved compared to the neat polycarbonate polyol.

19. The nanocomposite composition according to embodiment 18, wherein the improved performance property is viscosity (e.g., lower viscosity).

20. The nanocomposite composition according to embodiment 18, wherein the improved performance property is viscosity when measured by an oscillatory rheometer according to ASTM D7175, ASTM D7483, or the procedure described in Example 2.
21. The nanocomposite composition according to any one of embodiments 18-20, wherein the nanocomposite composition is characterized in that the viscosity when measured by an oscillatory rheometer is lower compared to that of the neat polycarbonate polyol.
22. The nanocomposite composition according to any one of the preceding embodiments, wherein the viscosity of the nanocomposite when measured by an oscillatory rheometer is less than about 20,000, less than about 10,000, less than about 5,000, less than about 1,000, or less than about 500 cP.
23. The nanocomposite composition according to any one of the preceding embodiments, wherein the viscosity of the nanocomposite when measured by an oscillatory rheometer is about 200 to about 20,000 cP, about 200 to about 10,000 cP, about 200 to about 5,000 cP, about 200 to about 1,000 cP, or about 200 to about 500 cP.
24. The nanocomposite composition according to any one of the preceding embodiments, wherein the polycarbonate polyol has a number average molecular weight (Mn) between about 500 and about 20,000, about 500 and about 10,000, about 500 and about 5,000, or about 500 and about 2,000 g/mol.
25. A method for preparing a nanocomposite composition, the method comprising the steps of:
  (a) providing a polycarbonate polyol,
    wherein the polycarbonate polyol comprises:
      (i) a polycarbonate polyol derived from copolymerization of $CO_2$ and one or more epoxides; or
      (ii) an aliphatic polycarbonate polyol;
  (b) providing a nanofiller; and
  (c) mixing compositions in steps (a) and (b), and allowing the mixture to form a nanocomposite composition.
26. The method of embodiment 25, wherein step (c) comprises solution intercalation.
27. The method of embodiment 25 or 26, wherein step (c) comprises elevated temperature.
28. The method according to any one of embodiments 25-27, wherein the nanocomposite composition is the nanocomposite composition according to any one of embodiments 1-24.
29. A method of improving a performance property of a polycarbonate polyol, the method comprising the step of forming a nanocomposite composition comprising i) the polycarbonate polyol and ii) a nanofiller.
30. The method according to embodiment 29, wherein the nanocomposite composition is a nanocomposite composition according to any one of embodiments 1-24.
31. The method according to embodiment 29 or 30, wherein the improved performance property is viscosity (e.g., lower viscosity).
32. The method according to embodiment 29 or 30, wherein the improved performance property is lower viscosity when measured by an oscillatory rheometer according to ASTM D7175, ASTM D7483, or the procedure described in Example 2.
33. The method according to any one of embodiments 25-32, wherein the nanocomposite composition is characterized in that viscosity when measured by an oscillatory rheometer is lower than that of the neat polycarbonate polyol.

EXAMPLES

The present invention is illustrated by the following examples. It is to be understood that the particular examples, materials, amounts, and procedures are to be interpreted broadly in accordance with the scope and spirit of the invention as set forth herein.

Example 1: Preparation and Characterization of PPC Polyol Nanocomposites

Polypropylene carbonate (PPC) polyol (Converge® 2012-112) used herein, is prepared by methods disclosed in, for example, PCT publication WO2010/028362, using dipropylene glycol as a starter and a cobalt salen catalyst disclosed in, for example, WO 2010/022388.

Modified montmorillonite (MMT) used herein, is modified with 25.0-30.0 wt % trimethyl stearyl ammonium and purchased from Sigma-Aldrich. Similar nanocomposites have been prepared with modified MMT comprising ammonium chloride, tetrapropylammonium bromide or cetyltrimethylammonium bromide.

General Procedures for Preparing PPC Polyol Nanocomposites

The PPC polyol nanocomposites were prepared by solution intercalation. In a typical reaction, 40.0 g of PPC polyol was dissolved in 160 mL of dichloromethane, and the resulting mixture was vigorously stirred for a few minutes at room temperature until a homogenous solution was obtained. An appropriate amount of MMT was subsequently added to the solution, and the resulting mixture was further stirred vigorously (rpm=800) at 80.0° C. under refluxing conditions for 5.0 h to ensure the intercalation/exfoliation of MMT with PPC polyols. The mixed solution was then placed in a rotary evaporator, at 80.0° C. for 1.0 h, to remove the solvent. The sample was collected and further dried overnight at room temperature for analysis.

Characterization of PPC Polyols in Corresponding Nanocomposites

The chemical structure of PPC polyols in nanocomposite samples containing different concentrations of nanoclay was investigated using $^1$H NMR (FIG. 1A). The signals of $^1$H NMR at 1.2-1.3 ppm represent terminal methyl protons (labeled "d" in FIG. 1A) of the PPC polyol. The signals at 4.8-5.0, 3.9-4.3 and 1.3-1.5 ppm in FIG. 1A are assigned to protons of methine (labeled "b" and "f" in FIG. 1A), methylene (labeled "c" and "e" in FIG. 1A), and internal methyl groups (labeled "a" in FIG. 1A), respectively. The $^1$H NMR analysis of PPC polyol noticeably exhibits a low signal intensity at 1.6 ppm, which is probably originated from a backbiting side reaction of epoxide and $CO_2$ producing a minor amount of cyclic carbonate by-product. $^1$H NMR spectra of PPC polyols in nanocomposites with different nanoclay concentrations did not show any major changes. This indicates that the incorporation of nanoclay has not influenced the chemical structure of the polyol.

Figure 1B:
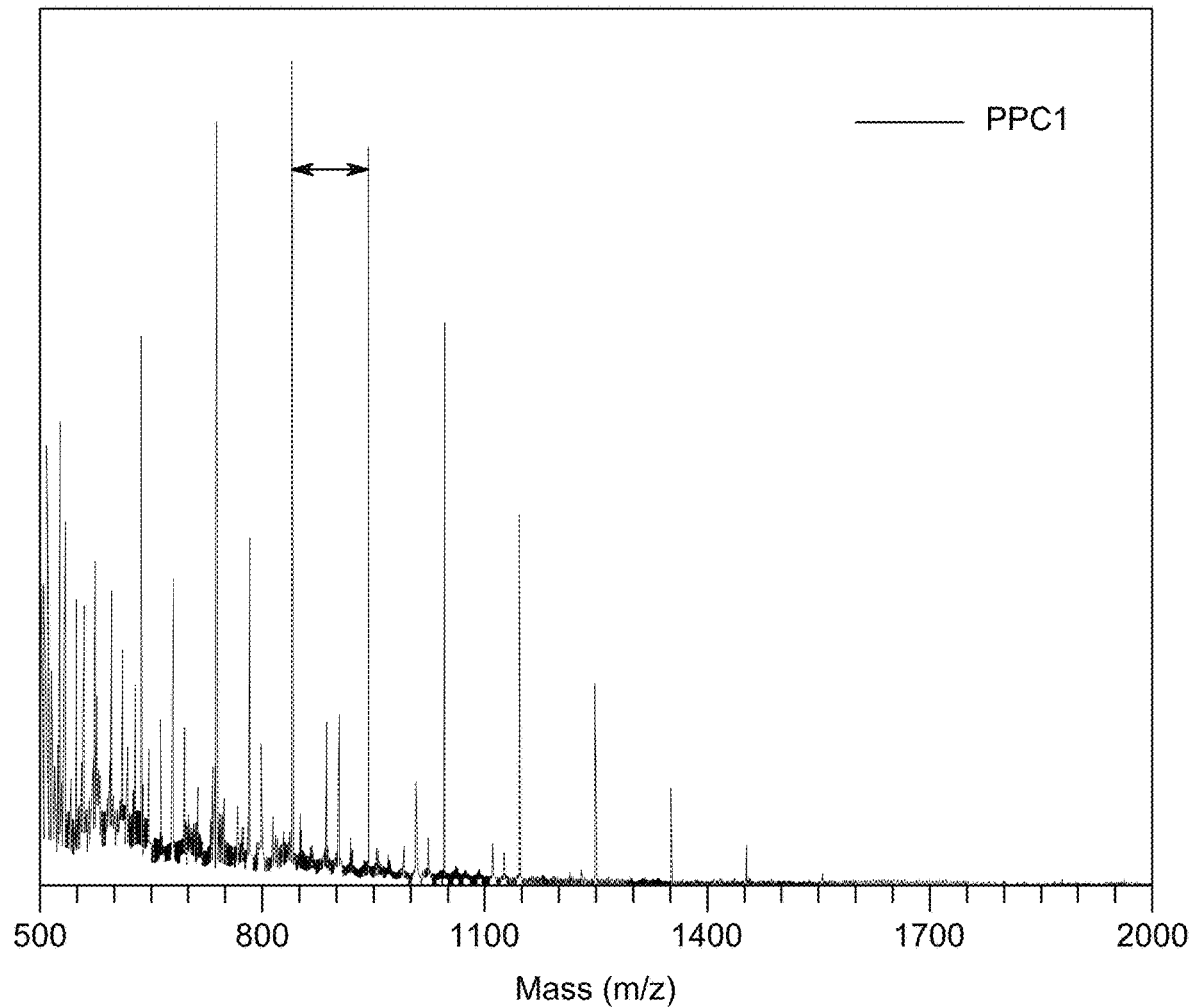
FIG. 1B depicts the MALDI-TOF mass spectrum of the nanocomposite composition with 1.0 wt % nanoclay.

The molecular weight of the PPC polyols in nanocomposite samples was determined by MALDI-TOF MS and GPC. As shown in FIG. 1B, a mass difference of 102 g/mol is displayed between adjacent peaks, which corresponds to one repeating unit of PPC polyol. The Mn and PDI values are listed in Table 1.

TABLE 1

Mn and PDI values of PPC polyols in nanocomposites. The number after the sample name represents the nanoclay concentration in wt %.

| Sample | Mn (g/mol) GPC | PDI |
|---|---|---|
| PPC0 | 1103 | 1.04 |
| PPC1 | 1040 | 1.04 |
| PPC2 | 1015 | 1.05 |
| PPC4 | 1058 | 1.05 |
| PPC8 | 1109 | 1.05 |

Example 2: Viscosity of PPC Polyol Nanocomposites

In order to assess the addition of the modified MMT on the viscosity behavior of the PPC polyol nanocomposites, rheology studies were carried out at 60.0° C. using steady or oscillatory shear. The shear rheological characteristics were investigated with a controlled stress rotational rheometer AR1500ex (TA Instruments, New Castle, DE, USA). A Peltier plate and cover were used to maintain a temperature of 60° C. while acquiring the flow curves. The measurements were carried out with a plate and cone fixture, with 20 mm diameter and 1° cone angle, using a gap of 22 μm which is the cone truncation height. See FIG. 2.

Figure 2A:
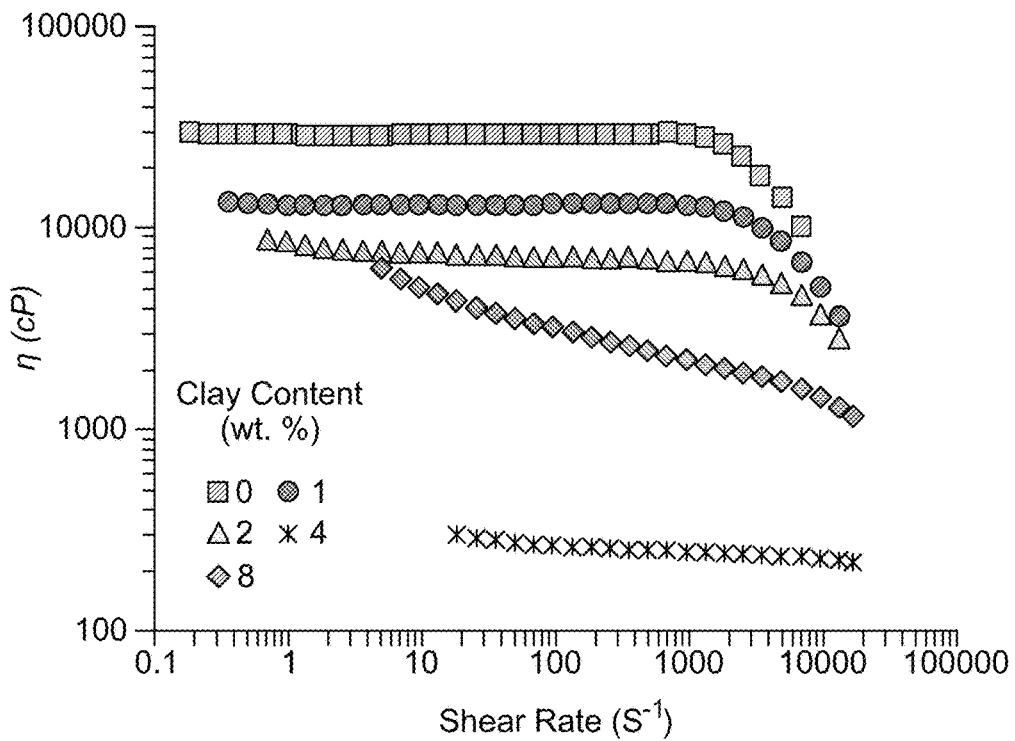
FIG. 2A depicts the viscosity of nanocomposite compositions comprising poly(propylene carbonate) with different nanoclay concentrations as a function of shear rate.
Figure 2B:
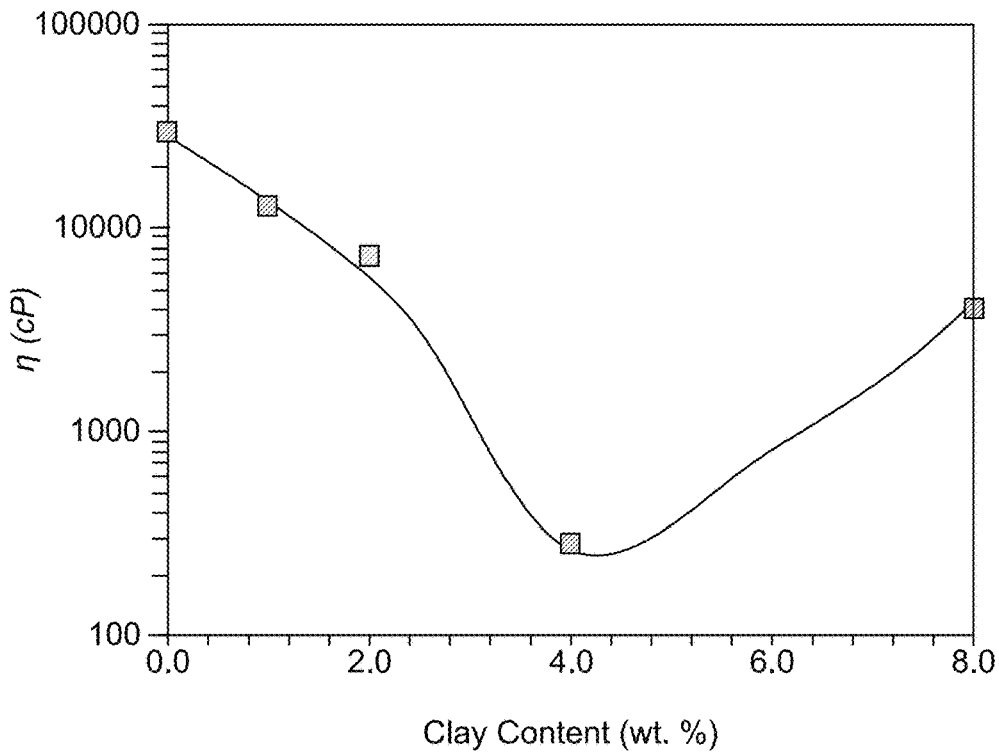
FIG. 2B depicts the viscosity of nanocomposite compositions comprising poly(propylene carbonate) as a function of different nanoclay concentrations using oscillatory shear at 60.0° C.

The viscosity of the nanocomposites is lower than that of the neat PPC polyol (FIG. 2A). By increasing the nanoclay concentration, the viscosity is reduced until a critical concentration $C_{cri}$ is reached. When $C_{cri}$ is exceeded, the viscosity of the nanocomposite increases, resulting in a U-shape behavior as shown in FIG. 2B. Without wishing to be bound by any particular theory, the reason for such behavior beyond $C_{cri}$ may be attributed to the coagulation of the nanoclay particles. Minimum viscosity of 300 cP was obtained at 4.0 wt % nanoclay, while the viscosity of the neat PPC polyol was 30,000 cP.

Example 3: Morphology of PPC Polyol Nanocomposites

Figure 3:
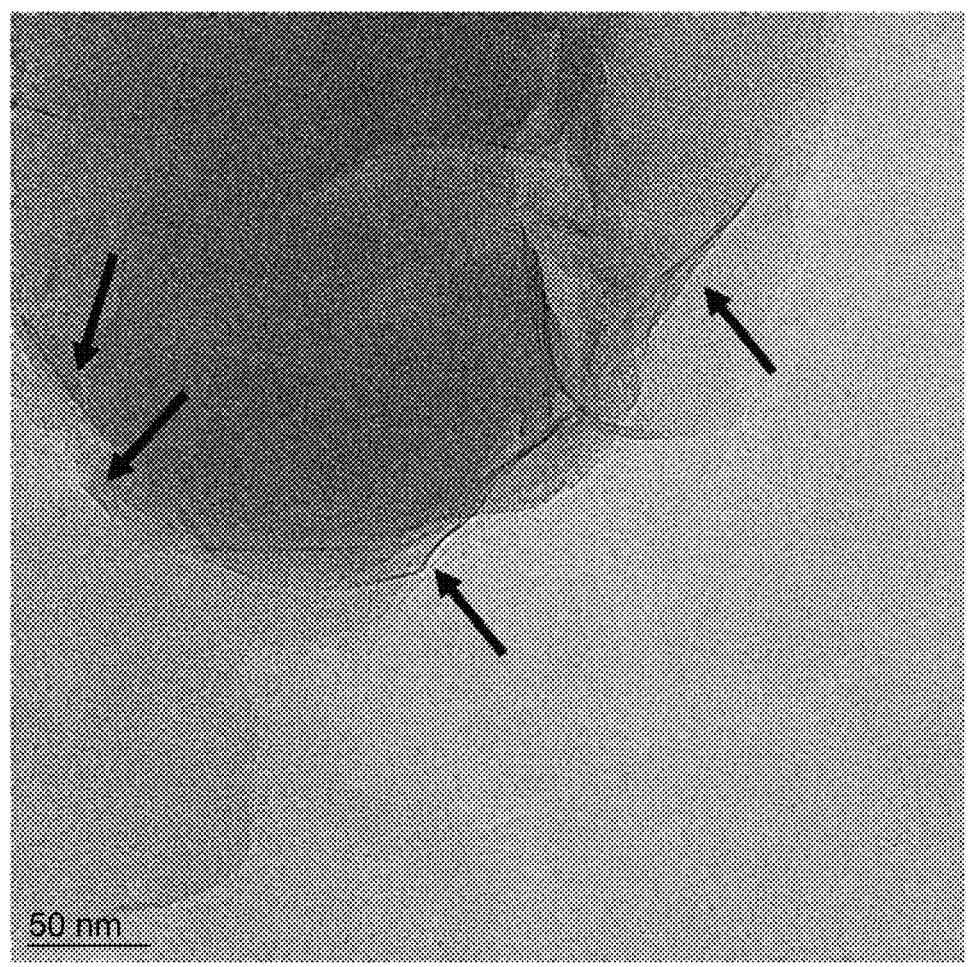
FIG. 3 depicts the transmission electron microscopy (TEM) image of a nanocomposite composition comprising poly(propylene carbonate) with 1.0 wt % exfoliated nanoclay. The arrows indicate exfoliated nanoclay.

Viscosity reduction could be attributed to well-dispersed nanoclay platelets in the polymer matrix. The high surface area of nanoclay platelets per unit volume of polymer matrix leads to a higher degree of dispersion of the nanoclay platelets. FIG. 3 demonstrates that the PPC polyol nanocomposite with 1.0 wt % nanoclay has a fully exfoliated structure. Such high degree of dispersion may account for the observed viscosity reduction in Example 2.

EQUIVALENTS

All material cited in this application, including, but not limited to, patents and patent applications, regardless of the format of such literature and similar materials, are expressly incorporated herein by reference in their entirety. In the event that one or more of the incorporated literature and similar materials differs from or contradicts this application, including but not limited to defined terms, term usage, described techniques, or the like, this application controls.

The invention claimed is:

1. A nanocomposite composition comprising a polycarbonate polyol and a nanofiller,
wherein the polycarbonate polyol comprises:
a polycarbonate polyol derived from copolymerization of carbon dioxide ($CO_2$) and one or more epoxides, or
an aliphatic polycarbonate polyol, and
the nanocomposite composition has a viscosity when measured by an oscillatory rheometer according to ASTM D7175, ASTM D7483, or the procedure described in Example 2, that is lower compared to that of a neat polycarbonate polyol.

2. The nanocomposite composition according to claim 1, wherein the polycarbonate polyol comprises polyol chains having a structure of P1:

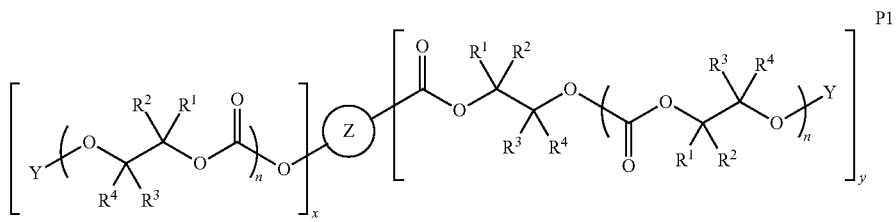

wherein,

R1, $R^2$, $R^3$, and $R^4$ are, independently at each occurrence in the polymer chain, selected from the group consisting of hydrogen and optionally substituted C1-C6 aliphatic;

Y is, at each occurrence, —H or the site of attachment to a chain-extending moiety bearing a hydroxyl group;

n is at each occurrence, independently an integer from about 2 to about 50;

Z is a covalent bond or a multivalent moiety; and x and y are each independently an integer from 0 to 6, where the sum of x and y is between 2 and 6.

3. The nanocomposite composition according to claim 2, wherein R1, $R^2$, $R^3$, and $R^4$ are, independently at each occurrence in the polymer chain, selected from the group consisting of hydrogen and methyl.

4. The nanocomposite composition according to claim 3, wherein Z is derived from a dihydric alcohol selected from the group consisting of diethylene glycol, triethylene glycol, tetraethylene glycol, poly(ethylene glycol) having a Mn of about 220 to about 2000 g/mol, dipropylene glycol, tripropylene glycol, and poly(propylene glycol) having a Mn between about 234 and about 2000 g/mol.

5. The nanocomposite composition according to claim 4, wherein the dihydric alcohol is dipropylene glycol.

6. The nanocomposite composition according to claim 1, wherein the polycarbonate polyol comprises polyol chains having a structure Q10:

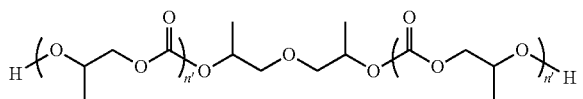

wherein each n' is, at each occurrence, independently an integer from about 2 to about 50.

7. The nanocomposite composition according to claim 1, wherein the nanofiller is a modified nanoclay comprising i) montmorillonite, ii) nanoclay modified by an ion-exchange reaction, wherein the inorganic nanoclay is treated with a functionalizing agent selected from ammonium salts, tetrapropylammonium salts, cetyltrimethylammonium salts, and trimethylstearylammonium salts, iii) exfoliated nanoclay, or combinations thereof.

8. The nanocomposite composition according to claim 7, wherein the modified nanoclay comprises about 1 to about 10 wt % of the nanocomposite, about 2 to about 8 wt % of the nanocomposite, about 3 to about 7 wt % of the nanocomposite, about 3 to about 6 wt % of the nanocomposite, about 3 to about 5 wt % of the nanocomposite, or about 4 wt % of the nanocomposite.

9. The nanocomposite composition according to claim 7, wherein the modified nanoclay comprises about 3 to about 5 wt % of the nanocomposite.

10. The nanocomposite composition according to claim 1, wherein the viscosity of the nanocomposite when measured by an oscillatory rheometer is less than about 20,000 cP, less than about 10,000 cP, less than about 9,000 cP, less than about 8,000 cP, less than about 7,000 cP, less than about 6,000 cP, less than about 5,000 cP, less than about 4,000 cP, less than about 3,000 cP, less than about 2,000 cP, less than about 1,000 cP, or less than about 500 cP.

11. The nanocomposite composition according to claim 1, wherein the viscosity of the nanocomposite when measured by an oscillatory rheometer is about 200 to about 20,000 cP, about 200 to about 10,000 cP, about 200 to about 9,000 cP, about 200 to about 8,000 cP, about 200 to about 7,000 cP, about 200 to about 6,000 cP, about 200 to about 5,000 cP, about 200 to about 4,000 cP, about 200 to about 3,000 cP, about 200 to about 2,000 cP, about 200 to about 1,000 cP, or about 200 to about 500 cP.

12. The nanocomposite composition according to claim 1, wherein the polycarbonate polyol has a number average molecular weight (Mn) between about 500 g/mol and about 20,000 g/mol, about 500 g/mol and about 10,000 g/mol, about 500 g/mol and about 5,000, g/mol or about 500 g/mol and about 2,000 g/mol.

13. A method for preparing a nanocomposite composition, the method comprising the steps of:
providing a polycarbonate polyol, wherein the polycarbonate polyol comprises:
a polycarbonate polyol derived from copolymerization of $CO_2$ and one or more epoxides; or
an aliphatic polycarbonate polyol;
providing a nanofiller; and
mixing compositions in steps (a) and (b), and allowing the mixture to form a nanocomposite composition, wherein the nanocomposite composition has a viscosity when measured by an oscillatory rheometer that is lower than that of a neat polycarbonate polyol.

14. The method of claim 13, wherein step (c) comprises solution intercalation, elevated temperature, or combinations thereof.

15. The method according to claim 13, wherein the nanocomposite composition comprises a polycarbonate polyol and a nanofiller,
wherein the polycarbonate polyol comprises
a polycarbonate polyol derived from copolymerization of carbon dioxide ($CO_2$) and one or more epoxides, or
an aliphatic polycarbonate polyol.

16. A method of improving a performance property of a polycarbonate polyol, the method comprising the step of forming a nanocomposite composition comprising i) the polycarbonate polyol and ii) a nanofiller, wherein the performance property is viscosity when measured by an oscillatory rheometer according to ASTM D7175, ASTM D7483, or the procedure described in Example 2, and wherein the nanocomposite composition has a viscosity when measured by an oscillatory rheometer that is lower than that of a neat polycarbonate polyol.

17. The method according to claim 16, wherein the nanocomposite composition comprises a polycarbonate polyol and a nanofiller,
wherein the polycarbonate polyol comprises
a polycarbonate polyol derived from copolymerization of carbon dioxide ($CO_2$) and one or more epoxides, or
an aliphatic polycarbonate polyol.

* * * * *